(12) United States Patent
Kim et al.

(10) Patent No.: US 12,741,884 B2
(45) Date of Patent: Sep. 22, 2026

(54) METHOD FOR REUSING ACTIVE MATERIAL BY USING POSITIVE ELECTRODE SCRAP

(71) Applicant: LG ENERGY SOLUTION, LTD., Seoul (KR)

(72) Inventors: Min-Seo Kim, Daejeon (KR); Se-Ho Park, Daejeon (KR); Doo-Kyung Yang, Daejeon (KR); Kwang-Wook Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1067 days.

(21) Appl. No.: 17/792,865

(22) PCT Filed: Jan. 14, 2021

(86) PCT No.: PCT/KR2021/000558

§ 371 (c)(1),
(2) Date: Jul. 14, 2022

(87) PCT Pub. No.: WO2021/261697

PCT Pub. Date: Dec. 30, 2021

(65) Prior Publication Data

US 2023/0063543 A1 Mar. 2, 2023

(30) Foreign Application Priority Data

Jun. 23, 2020 (KR) ........................ 10-2020-0076728

(51) Int. Cl.
*H01M 10/54* (2006.01)
*C22B 7/00* (2006.01)

(52) U.S. Cl.
CPC ............. *H01M 10/54* (2013.01); *C22B 7/008* (2013.01)

(58) Field of Classification Search
CPC ............................... H01M 10/54; C22B 7/008
See application file for complete search history.

(56) References Cited

U.S. PATENT DOCUMENTS

2013/0323142 A1* 12/2013 Shimano ............. H01M 4/0471 423/49
2016/0251740 A1 9/2016 Bi et al.
(Continued)

FOREIGN PATENT DOCUMENTS

CN 105895854 A 8/2016
CN 105990617 A 10/2016
(Continued)

OTHER PUBLICATIONS

Sieber et al. (2019). "Recovery of Li (Ni0.33Mn0.33Co0.33)O2 from Lithium-Ion Battery Cathodes: Aspects of Degradation", Nanomaterials, vol. 9, 246, 14 pages, XP93054531.

*Primary Examiner* — Wayne A Langel
*Assistant Examiner* — Annette Phan
(74) *Attorney, Agent, or Firm* — Bryan Cave Leighton Paisner LLP

(57) ABSTRACT

There is provided a method for collecting and reusing an active material from positive electrode scrap. The method of reusing a positive electrode active material of the present disclosure includes (a) thermally treating a positive electrode scrap comprising an active material layer on a current collector in air for thermal decomposition of a binder and a conductive material in the active material layer, to separate the current collector from the active material layer, and collecting an active material in the active material layer, (b-1) washing the active material collected from the step (a) with a lithium compound solution which is basic in an aqueous solution, and drying, (b-2) grinding the active material dried from the step (b-1), (b-3) adding a lithium compound to the active material ground from the step (b-2), and (c) annealing the active material having the lithium precursor added thereto, to obtain a reusable active material.

16 Claims, 11 Drawing Sheets

(56) References Cited

U.S. PATENT DOCUMENTS

2018/0013181 A1 1/2018 Ho et al.
2018/0212282 A1* 7/2018 Lee ........................ C22B 7/001
2019/0273290 A1 9/2019 Sloop

FOREIGN PATENT DOCUMENTS

CN 106505271 A * 3/2017 ............ H01M 10/54
CN 104538696 B 4/2017
CN 107994286 A 5/2018
CN 110137449 A * 8/2019 ............ H01M 4/583
CN 110165324 A 8/2019
CN 110842006 A * 2/2020 ............ H01M 10/54
CN 111129487 A 5/2020
JP 2012-186150 A 9/2012
KR 10-2003-0070469 A 8/2003
KR 10-2005-0112487 A 11/2005
KR 101439427 B1 * 9/2014 .......... H01M 10/052
KR 10-2016-0008040 A 1/2016
KR 10-2017-0033787 A 3/2017
KR 10-2017-0075124 A 7/2017
KR 10-1808121 B1 12/2017
KR 10-2018-0100414 A 9/2018
KR 10-1992715 B1 6/2019

* cited by examiner

METHOD FOR REUSING ACTIVE MATERIAL BY USING POSITIVE ELECTRODE SCRAP

CROSS-REFERENCE TO RELATED APPLICATIONS

The present application is a National Phase entry pursuant to 35 U.S.C. § 371 of International Application No. PCT/KR2021/000558, filed on Jan. 14, 2021, and claims the benefit of and priority to Korean Patent Application No. 10-2020-0076728, filed on Jun. 23, 2020 with the Korean Intellectual Property Office, the disclosures of which are incorporated herein by reference in their entirety for all purposes as if fully set forth herein.

TECHNICAL FIELD

The present disclosure relates to a method for reusing resources in the fabrication of a lithium secondary battery. More particularly, the present disclosure relates to a method for collecting and reusing positive electrode scrap generated in the lithium secondary battery fabrication process or positive electrode active materials of lithium secondary batteries discarded after use.

BACKGROUND

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles which are powered by electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to collect and recycle invaluable metals from lithium secondary batteries (waste batteries) discarded after the expiration date. In addition to waste batteries, resources may be more preferably collected from waste materials discarded after punching the positive electrode plate or the positive electrode in which defects or failures occurred during the process.

Currently, the lithium secondary battery is fabricated, as shown in FIG. 1, by coating a positive electrode slurry including a positive electrode active material, a conductive material, a binder and a solvent on a long sheet-type positive electrode current collector 10 such as an aluminum (Al) foil to form a positive electrode active material layer 20, manufacturing a positive electrode sheet 30, and punching a positive electrode plate 40 to a predetermined size. The leftover after punching is discarded as positive electrode scrap 50. If the positive electrode active material is collected and reused from the positive electrode scrap 50, it will be very desirable in the industrial-economic and environmental aspects.

Most of the existing methods of collecting the positive electrode active material include dissolving the positive electrode with hydrochloric acid, sulfuric acid, nitric acid or the like, extracting the active material elements such as cobalt, nickel and manganese and using them as raw materials for the positive electrode active material synthesis. However, the active material element extraction using acids uses a non-eco-friendly process to collect pure raw materials, and needs a neutralization process and a waste water treatment process, resulting in the increased process cost. Additionally, it is impossible to collect lithium, one of the key positive electrode active material elements. To overcome these disadvantages, there is a need for a direct reuse method that does not dissolve the positive electrode active material and does not extract the active material in the form of an element.

Meanwhile, the positive electrode sheet 30 usually goes through roll pressing. Thus, in the case of the positive electrode scrap from the electrode, the particles on the surface may be cracked or chipped when pressed down by the roll pressing process. The unused fresh active material has no particle cracking or chipping, but in the case of reusable active material obtained from the roll pressed electrode, with the increasing particles cracked or chipped by roll pressing, the specific surface area of the active material increases, which affects the slurry properties, electrode adhesion and electrode performance reused during reuse. Accordingly, it is necessary to solve the problem.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure is directed to providing a method for collecting and reusing active materials from positive electrode scrap.

Technical Solution

To achieve the above-described problem, a method for reusing a positive electrode active material reuse method of the present disclosure includes (a) thermally treating a positive electrode scrap comprising an active material layer on a current collector in air for thermal decomposition of a binder and a conductive material in the active material layer, to separate the current collector from the active material layer, and collecting an active material in the active material layer, (b-1) washing the active material collected from the step (a) with a lithium compound solution which is basic in an aqueous solution, and drying, (b-2) grinding the active material dried from the step (b-1), (b-3) adding a lithium precursor to the active material ground from the step (b-2), and (c) annealing the active material having the lithium precursor added thereto, to obtain a reusable active material.

In the present disclosure, the method may further include (d) surface-coating the active material annealed from the step (c).

In the present disclosure, the active material layer comprises a lithium composite transition metal oxide which may include secondary particles formed by agglomeration of primary particles having a predetermined size, and the grinding step (b-2) may include reducing the size of the active material dried from the step (b-1) to a particle size that is larger than the size of the primary particles.

The lithium composite transition metal oxide may include nickel, cobalt and manganese.

The thermal treatment in the step (a) may be performed at 300 to 650° C.

The thermal treatment in the step (a) may be performed at 550° C. for 30 min at the temperature rise rate of 5° C./min.

The lithium compound solution may contain a lithium compound, preferably LiOH, in an amount of more than 0% and 15% or less. The washing may be performed within 1 hour.

The washing in the step (b-1) may be performed by stirring the active material collected from the step (a) at the same time with immersing in the lithium compound solution.

In the present disclosure, the grinding step (b-1) may be performed using a ball mill, a planetary mill, a grinder, a 3-roll mill or a jet mill.

The step (b-3) may include adding the lithium precursor to the active material in a solid or liquid state.

In particular, the step (b-3) preferably includes mixing the active material ground from the step (b-2) with a lithium precursor solution and spray drying to obtain the active material with an adjusted particle size.

The lithium precursor may be one or more selected from the group consisting of LiOH, $Li_2CO_3$, $LiNO_3$ and $Li_2O$.

The lithium precursor may be added in an amount for adding lithium at a ratio of lost lithium to a ratio between lithium and other metal in a raw active material used in the active material layer.

For example, the lithium precursor may be included in the lithium precursor solution in an amount corresponding to an amount of lithium at a molar ratio of 0.001 to 0.4 relative to an amount of lithium in the active material layer.

Further, an additional lithium precursor may be further included in the lithium precursor solution in an amount corresponding to an amount of lithium at a molar ratio of 0.0001 to 0.1 relative to an amount of lithium in the active material layer.

The annealing may be performed in air at 400 to 1000° C.

A temperature of the annealing step may exceed a melting point of the lithium precursor.

The active material in the active material layer may be collected in a form of powder, and carbon produced by carbonization of the binder or the conductive material may not remain on a surface of the powder.

The surface-coating step (d) may include coating at least one of a metal, an organic metal or a carbon material on a surface of the active material annealed from the step (c) by a solid or liquid phase process, and thermally treating at 100 to 1200° C.

The reusable active material may be represented by the following Formula 1:

$$Li_aNi_xMn_yCo_zM_wO_{2+\delta} \quad \text{[Formula 1]}$$

where M comprises at least one selected from the group consisting of B, W, Al, Ti and Mg, $1<a\leq1.1$, $0<x<0.95$, $0<y<0.8$, $0<z<1.0$, $0\leq w\leq0.1$, $-0.02\leq\delta\leq0.02$, $x+y+z+w=1$.

The reusable active material may have a fluorine (F) content of 100 ppm or less.

The lithium precursor is added in an amount corresponding to an amount of lithium depleted during the steps (a) and (b-1).

Advantageous Effects

According to the present disclosure, it is possible to reuse waste positive electrode active materials such as positive electrode scrap generated in the lithium secondary battery fabrication process without using acids, thereby achieving eco-friendliness. The method according to the present disclosure does not need a neutralization process or a waste water treatment process, thereby achieving environmental mitigation and process cost reduction.

According to the present disclosure, it is possible to collect all the metal elements of the positive electrode active materials. It is possible to collect the current collector since it does not dissolve the current collector. This method does not use the extracted active material elements as raw materials for positive electrode active material synthesis, and instead directly reuses the active materials collected in the form of powder, thereby achieving economical efficiency.

According to the present disclosure, toxic and explosive solvents such as NMP, DMC, acetone and methanol are not used, thereby achieving safety, and since simple processes such as thermal treatment, washing and annealing are used, it is easy to manage the process and suitable for mass production.

According to the present disclosure, it is possible to ensure excellent resistance characteristics and capacity characteristics without electrochemical performance degradation of the collected active materials.

According to the present disclosure, cracked or chipped particles during roll pressing in the previous process may form microparticles through the active material grinding step. It is possible to accomplish the re-granulation of the microparticles through particle size adjustment in the subsequent step after grinding, thereby improving the particle size and specific surface area.

In particular, when the ground active material is mixed with the lithium precursor solution and spray dried according to an aspect of the present disclosure, it is possible to accomplish re-granulation and lithium precursor compensation at the same time, thereby obtaining active materials with lithium precursor addition and particle size adjustment by a simple process.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Figure 1:
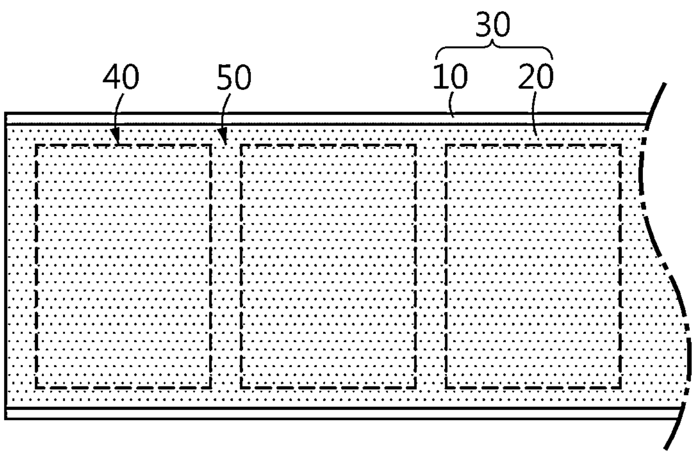
FIG. 1 is a diagram showing positive electrode scrap discarded after punching a positive electrode plate in a positive electrode sheet.

Hereinafter, the embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just an example, and do not fully describe the technical aspect of the present disclosure, so it should be understood that a variety of other equivalents and modifications could have been made thereto at the time of filing the patent application.

In the following description, a reference is made to the accompanying drawings that make up some of the present disclosure. The embodiments described in the detailed description, the drawings and the appended claims are not intended to be limiting. Other embodiments may be used without departing from the technical aspect and scope of the subject matter disclosed herein, and modifications and changes may be made thereto. As commonly described herein and illustrated in the drawings, the aspects of the present disclosure may include arrangement, substitution, combination, separation and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art).

The present disclosure is not limited to specific embodiments described herein. As obvious to those skilled in the art, many modifications and changes may be made thereto without departing from the technical aspects and scope of the present disclosure. In addition to those enumerated herein, functionally equivalent methods in the scope of the present disclosure will be obvious to those skilled in the art from the previous descriptions. Such modifications and changes fall in the scope of the appended claims. The present disclosure will be defined by the appended claims along with the scope of all equivalents to which the appended claims are entitled. It should be understood that the present disclosure is not limited to specific variant methods. It should be further understood that the terms used herein are for the purpose of describing the specific embodiments, but not intended to limit the present disclosure.

The conventional active material reuse process is mainly aimed at extracting the elements of invaluable metals (nickel, cobalt, manganese) in active materials of lithium secondary batteries of which the performance degraded after use and re-synthesizing the active materials, and as opposed to the conventional process, the present disclosure is characterized as collecting active materials from positive electrode scrap generated in the lithium secondary battery fabrication process.

In addition, the well-known active material reuse process involves producing metals (direct reduction method) or resynthesized active materials from invaluable metals extracted through acid/base dissolution or melting using reduction agents/additives, which requires an additional chemical method, making the process complex and causing additional economical expenses. However, the present disclosure relates to a method for reusing positive electrode active materials directly without dissolving the positive electrode active materials.

To directly reuse the positive electrode active materials, it is necessary to remove the current collector from the positive electrode. The current collector may be removed from the positive electrode by removing the binder through high temperature thermal treatment, melting the binder using the solvent, melting the current collector, and screening the active materials through dry milling and sieving.

When melting the binder using the solvent, the stability of the solvent is important. NMP is the most efficient solvent, but its disadvantage is toxicity and high cost. Another disadvantage is that a waste solvent re-treatment or solvent collection process is necessary. Melting the current collector requires a lower process cost than using the solvent. However, it is difficult to remove impurities from the reusable active material surface, and hydrogen gas is produced in the current collector removal process, causing an explosion risk. Dry milling and sieving cannot perfectly separate the current collector and the active material. The particle size distribution of the active materials changes in the milling process and it is difficult to remove the binder, resulting in characteristics degradation of batteries including the reusable active materials.

The present disclosure separates the active material and the current collector using high temperature thermal treatment. In particular, since thermal treatment is performed in air, the process only requires heating without any special device configuration and thus is relatively simple, and it is suitable for mass production and commercialization. In this instance, impurities should not remain on the reusable active material surface. The present disclosure proposes removing impurities from the reusable active material surface.

Figure 2:
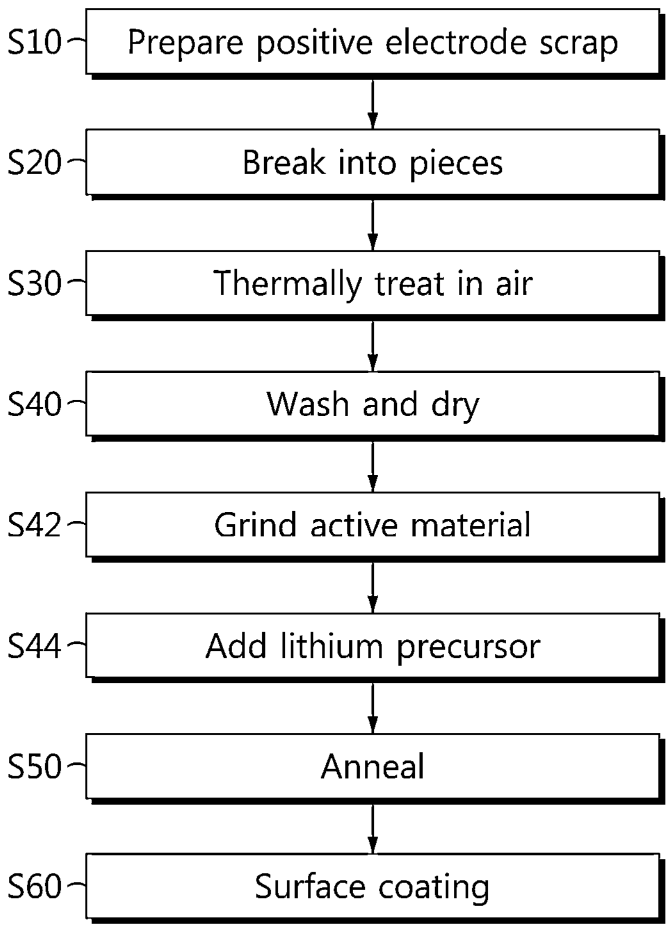
FIG. 2 is a flowchart of an active material reuse method according to the present disclosure.

Hereinafter, the active material reuse method according to an embodiment of the present disclosure will be described with reference to FIG. 2. FIG. 2 is a flowchart of the active material reuse method according to the present disclosure.

Referring to FIG. 2, first, waste positive electrode scrap is prepared (S10).

As described above with reference to FIG. 1, positive electrode scrap may be leftover after manufacturing a positive electrode sheet including a lithium composite transition metal oxide positive electrode active material layer on a current collector and punching the positive electrode sheet. In addition, positive electrode scrap may be prepared by collecting positive electrodes in which defects or failures occurred during the process. Additionally, positive electrode scrap may be prepared by separating positive electrodes from lithium secondary batteries discarded after use.

For example, positive electrode scrap may be the leftover after coating a slurry on a sheet type current collector of an aluminum foil, the slurry prepared by adding N-methyl pyrrolidone (NMP) to lithium composite transition metal oxide comprising nickel (Ni), cobalt (Co) and manganese (Mn) (hereinafter simply referred to as NCM-based lithium composite transition metal oxide) as an active material, carbon such as carbon black as a conductive material and polyvinylidene fluoride (PVdF) as a binder and mixing, then drying in a vacuum oven of about 120° C. to manufacture a positive electrode sheet, and punching a positive electrode plate into a predetermined size.

The positive electrode active material of lithium secondary batteries includes lithium composite transition metal oxide, and in particular, lithium cobalt oxide such as $LiCoO_2$, lithium manganese oxide ($LiMnO_2$ or $LiMn_2O_4$), lithium iron phosphate compounds ($LiFePO_4$) or lithium nickel oxide ($LiNiO_2$). Additionally, to improve low thermal stability while maintaining excellent reversible capacity of $LiNiO_2$, nickel manganese-based lithium composite metal oxide with the partial substitution of manganese (Mn) having excellent thermal stability for nickel (Ni) and NCM-based lithium composite transition metal oxide substituted with manganese (Mn) and cobalt (Co) are used. In particular, the present disclosure proposes reusing NCM-based lithium composite transition metal oxide active materials.

The positive electrode scrap has the active material layer on the current collector of a metal foil such as the aluminum foil. The active material layer is formed by coating the slurry including a mixture of the active material, the conductive material, the binder and the solvent, and after solvent volatilization, the active material and the conductive material are bonded by the binder. Accordingly, when the binder is removed, the active material may be separated from the current collector.

Subsequently, the positive electrode scrap is broken into pieces to a proper size (S20). Breaking into pieces refers to cutting or shredding of the positive electrode scrap to a proper size for handling. After the cutting or shredding, the size of the positive electrode scrap is reduced to, for example, 1 cm×1 cm. A variety of dry milling equipment including a hand-mill, a pin-mill, a disk-mill, a cutting-mill and a hammer-mill, and a high speed cutter may be used to break into pieces.

The cutting or shredding may be performed considering the handling of the positive electrode scrap and the characteristics required in equipment used in the subsequent processes. For example, when equipment requiring continuous treatment in the loading and unloading of the positive electrode scrap is used, it is necessary to break too large positive electrode scrap into pieces to facilitate the movement of the positive electrode scrap.

Subsequently, the positive electrode scrap is thermally treated in air (S30).

In the present disclosure, thermal treatment is performed for thermal decomposition of the binder in the active material layer. The thermal treatment may be performed at 300 to 650° C., and may be referred to as high temperature thermal treatment. At temperatures of less than 300° C., it is difficult to remove the binder, failing to separate the current collector, and at temperatures of 650° C. or above, the current collector melts (Al melting point: 660° C.), failing to separate the current collector.

The thermal treatment time is long enough for thermal decomposition of the binder. For example, the thermal treatment time is about 30 min Preferably, the thermal treatment time is 30 min or longer. As the thermal treatment time increases, the thermal decomposition of the binder is prolonged, but when the thermal treatment time is equal to or longer than a predetermined time, there is no difference in thermal decomposition effect. Preferably, the thermal treatment time is 30 min or longer and 5 hours or shorter.

The thermal treatment equipment may include various types of furnaces. For example, the thermal treatment equipment may be a box type furnace, and when considering productivity, may be a rotary kiln capable of continuous treatment.

The thermal treatment may be followed by fast or slow cooling in air.

For example, the thermal treatment may be performed at 550° C. for 30 min at the temperature rise rate of 5° C./min. For example, the temperature rise rate is within the allowable range of the box type furnace and is enough to heat the positive electrode scrap without thermal shock. 550° C. is for good thermal decomposition of the binder, taking into account the melting point of the Al current collector. When the thermal treatment is performed at the above-described temperature for less than 10 min, thermal decomposition is insufficient, and thus it is necessary to perform the thermal treatment for 10 min or longer, and preferably for 30 min or longer.

$CO_2$ and $H_2O$ produced by the thermal decomposition of the binder and the conductive material in the active material layer through the thermal treatment in air are removed. Since the binder is removed, the active material may be separated from the current collector and the active material to collect may be screened in the form of powder. Accordingly, the current collector may be separated from the active material layer and the active material in the active material layer may be collected by S30.

It is important to perform the thermal treatment of S30 in air. When the thermal treatment is performed in a reducing or inert gas atmosphere, the binder and the conductive material suffer carbonization rather than thermal decomposition. When carbonized, carbon remains on the active material surface and degrades the performance of the reusable active materials. When the thermal treatment is performed in air, carbon in the binder or the conductive material is removed by combustion reaction with oxygen to produce CO, $CO_2$ gas, and thus the binder and the conductive material do not remain and are almost removed.

Accordingly, according to the present disclosure, the active material is collected in the form of powder, and carbon produced by the carbonization of the binder or the conductive material may not remain on the surface.

Subsequently, the collected active material is washed and dried (S40). It is important to wash with a lithium compound solution which is basic in an aqueous solution. The lithium compound solution contains a lithium compound, preferably LiOH, in an amount of more than 0% and 15% or less. Preferably, the amount of LiOH is 15% or less. When LiOH is included in an excessive amount, excess LiOH may remain on the active material surface after washing, which may affect the subsequent annealing process. It is undesirable to add excess LiOH to make the active material surface before annealing as clean as possible, and the amount of LiOH is limited to 15% or less.

The washing may be performed by immersing the collected active material in the lithium compound solution. The washing may be performed within a week after immersion, preferably a day, and more preferably 1 hour. When washing is performed for a week or longer, the capacity may reduce due to excessive lithium dissolution. Accordingly, it is desirable to wash within 1 hour. The washing includes immersing the active material in the lithium compound solution which is basic in an aqueous solution, and stirring in the immersed state. It is desirable to perform immersion and stirring together. When the active material is immersed in the lithium compound solution without stirring, the washing process is slow, resulting in lithium dissolution. When stirring is performed together, the process time is minimized, and accordingly it is desirable to perform the stirring at the same time with the immersion in the lithium compound solution. The drying may be performed in air in an oven (convection type) after filtration.

The washing with the lithium compound solution which is basic in an aqueous solution is performed for removal of LiF and metal fluoride that may be present on the surface of the collected active material and surface modification. During the thermal treatment of S30, the binder and the conductive material in the active material layer are removed by evaporation of $CO_2$ and $H_2O$, and in this process, $CO_2$ and $H_2O$ react with lithium on the active material surface to produce $Li_2CO_3$, LiOH, and fluorine (F) present in the binder such as PVdF reacts with the metal element of the positive electrode active material to produce LiF or metal fluoride. When LiF or metal fluoride remains, the characteristics of batteries including the reusable active materials degrade. The present disclosure adds the washing step of S40, to remove reactants that may be generated on the reusable active material surface during the thermal treatment step (S30), in order to prevent impurities from remaining on the reusable active material surface.

In S40, it is important to wash with the lithium compound solution which is basic in an aqueous solution. When a sulfuric acid or hydrochloric acid aqueous solution is used instead of the lithium compound solution which is basic in an aqueous solution, F on the active material surface is washed out, but the performance of the reusable positive electrode active materials may degrade due to dissolution of transition metal (Co, Mg) present in the active material. The lithium compound solution which is basic in an aqueous solution used in the present disclosure plays a role in removing trace amounts of binder that may be left after the thermal decomposition of S30, does not dissolve the transition metal present in the active material, and compensates for the amount of lithium dissolved in the washing process.

Through S40, the present disclosure may adjust the LiF content on the collected active material surface to less than 500 ppm, thereby improving the capacity. Preferably, the F content may be 100 ppm or less. More preferably, the F content may be 30 ppm or less. The washing removes LiF or the lithium metal compound formed by the binder decomposition, thereby improving the electrical resistance characteristics.

Subsequently, the dried active material is ground (S42). The lithium composite transition metal oxide includes macroparticles or secondary particles formed by agglomeration of primary particles having the size of a few tens to a few hundreds of nm, and the grinding step may include breaking down the dried active material to a particle size that is larger than the size of the primary particles. The grinding step (S42) may be performed using a ball mill, a planetary mill, a grinder, a 3-roll mill or a jet mill.

As well known, the ball mill and the planetary mill are used for powder mixing and grinding. There are various types of grinders. The 3-roll mill is used to disperse and grind an input paste sample by rotation of 3 rollers at different rotational speeds. The jet mill is a fine pulverizer that sprays jets of compressed air or water vapor of a few magnitudes of atmospheric pressure from a specialized nozzle, sucks raw materials by the high speed jets, and causes sufficient particle acceleration for the particles to collide with each other or a collision plate into smaller pieces. It is used when using products having the size of a few nm in a dry manner, and in particular, less heat is generated by grinding. Structurally, a screen may be attached to the grinder to obtain ground products of desired sizes.

In the case of the positive electrode scrap from the electrode, the particles on the surface may be cracked or chipped when pressed down by the roll pressing process. In particular, compared to LCO, the NCM-based active material suffers severe particle cracking or chipping by the roll pressing in the electrode fabrication, and a larger amount of small particles is present in the collected active material than the raw active material (i.e., unused fresh active material) used in the active material layer, resulting in non-uniform particles. For the reusable level of active material, its particle size distribution is preferably similar or identical to that of fresh active material.

The NCM-based active material includes macroparticles or secondary particles formed by agglomeration of primary particles having the size of a few tens to a few hundreds of nm, and in the positive electrode manufactured using the active material, the secondary particles may be broken down into primary particles or microparticles that are larger than primary particles but smaller than macroparticles during the roll pressing process to adjust the porosity in the electrode. As the particles cracked or chipped by the roll pressing increase, the specific surface area of the active material increases, and reusable active materials obtained from the roll pressed electrode may affect the slurry properties, electrode adhesion and electrode performance when reused. Accordingly, the present disclosure solves this problem through the grinding step S42.

In this step S42, the cracked or chipped particles in the previous process may form microparticles. The microparticles may be the active material ground to a particle size that is larger than the size of primary particles. Subsequently, re-granulation may be accomplished by adjusting the particle size again in the subsequent process such as lithium precursor addition or annealing, thereby improving the particle size and specific surface area.

Subsequently, a lithium precursor is added to the ground active material (S44).

Losses of lithium in the active material may occur through the previous steps S30 and S40. S44 compensates for the lithium loss. In the step of adding the lithium precursor to the ground active material (S44), the lithium precursor may be added in a solid or liquid state. Preferably, the lithium precursor in S50 may be at least one LiOH, $Li_2CO_3$, $LiNO_3$ or $Li_2O$.

The addition of the lithium precursor in a solid state may be performed by a powder mixing or milling process. The addition of the lithium precursor in a solid state may induce the re-granulation of the ground active material.

The lithium precursor is added in an amount for adding lithium at a ratio of lithium loss to a ratio of lithium and other metal in the raw active material (i.e., fresh active material) used in the active material layer. For example, when the ratio of lithium and other metal in the fresh active material is 1, the lithium precursor may be added in an amount for adding lithium at a molar ratio of 0.001 to 0.4. It is proper to add lithium at the molar ratio of 0.01 to 0.2. The addition of the lithium precursor exceeding the lithium lost through washing causes unreacted lithium precursors to be left on the reusable active material, resulting in the increased resistance in the active material reuse process, and accordingly it is necessary to feed the lithium precursor in an optimal amount.

Additionally, the lithium precursor is preferably added in an amount for adding more lithium at the molar ratio of 0.0001 to 0.1 based on a 1:1 molar ratio of lithium:other metal. The addition of excess lithium is for forming a surface protection layer on the active material by surface-coating, and it will be described in more detail below. When secondary batteries are manufactured using the active material, it is possible to suppress the side reactions by the electrolyte solution and maintain the life characteristics.

In the step of adding the lithium precursor to the ground active material (S44), the lithium precursor may be added in a liquid state. In particular, it is desirable to mix the ground active material with a lithium precursor solution and spray dry to obtain the active material with particle size adjustment.

The lithium precursor solution includes a lithium compound that dissolves in an aqueous solution or an organic solvent, and preferably, the temperature in the spray drying step is 80° C. or above, and when the temperature is equal to or lower than 80° C., the solution may not be completely dried. More preferably, the temperature in the spray drying step may be 100 to 300° C.

The spray drying avoids particle agglomeration caused by drying, and produces the active material in a powder state, not agglomerated. In the spray drying, the lithium precursor solution is dried immediately after spraying and the lithium precursor is coated on or comes into contact with the active material surface, and in this instance, the particles agglomerate by the capillary force while the lithium precursor solution as the solvent is dried, leading to particle adjustment.

The proposed spray drying induces agglomeration of the microparticles formed in the previous grinding step to recover to larger particles, thereby solving the particle non-uniformity and making the particle size similar to the initial characteristics of fresh active material. Accordingly, it is expected that the characteristics of batteries using the active material collected by the method according to the present disclosure will be at the similar level to the characteristics of batteries using fresh active material.

Additionally, when the ground active material is mixed with the lithium precursor solution and spray dried, it is possible to accomplish re-granulation and lithium precursor compensation at the same time, thereby obtaining the active material with lithium precursor addition and particle adjustment by a simple process. The lithium precursor coating, drying and granulation (particle re-adjustment) are simultaneously performed in one step.

Through the spray drying, the lithium precursor is coated on the active material surface and the active material with particle size adjustment is obtained. Since lithium precursor addition, re-granulation and drying are performed in one step, it is possible to simplifying the process. Additionally, the spray drying is not a means for simply obtaining the active material, and is a means for re-granulation of the active material microparticles obtained in the previous grinding.

Figure 3:
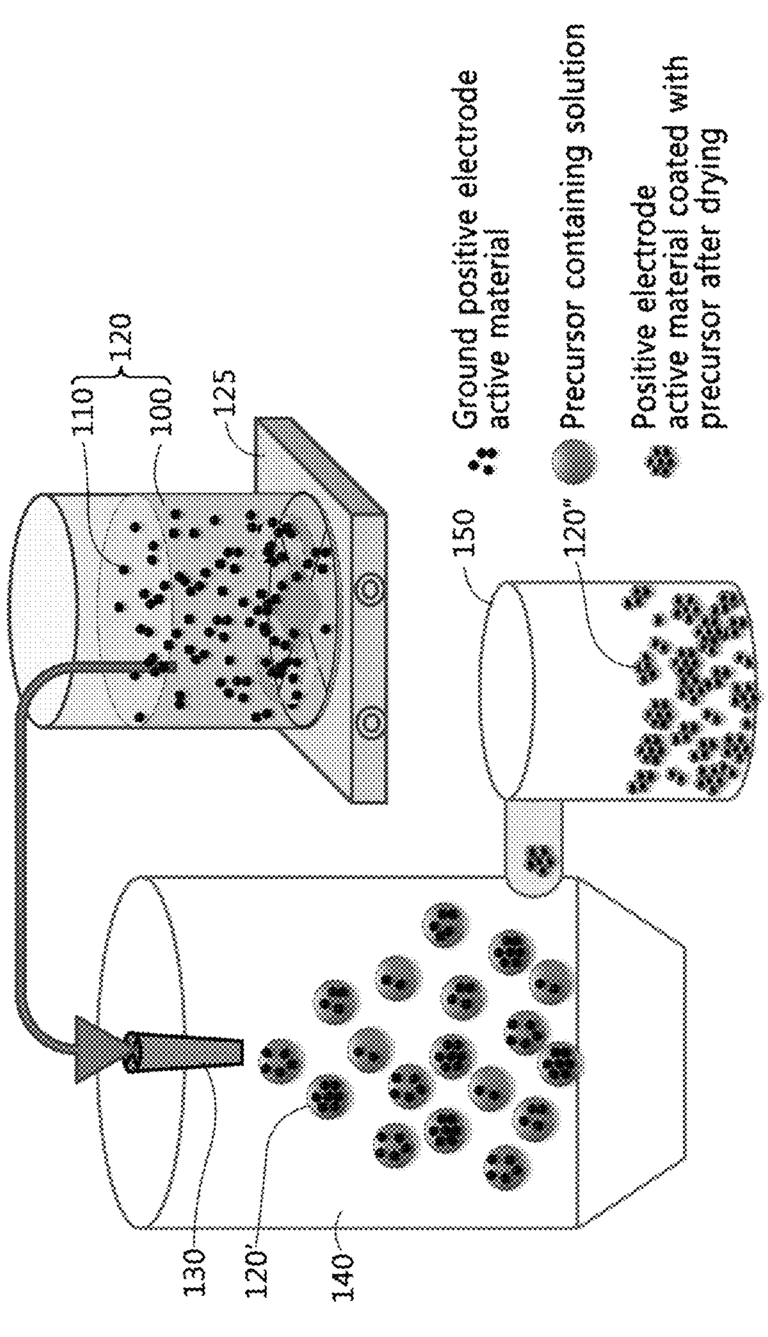
FIG. 3 is a diagram showing a lithium precursor addition step by dry spraying in a lithium precursor addition step of FIG. 2.

The spray drying may use the common spray drying equipment. FIG. 3 is a diagram showing the lithium precursor addition step by spray drying in the lithium precursor addition step of FIG. 2.

Referring to FIG. 3, a lithium precursor aqueous solution 100 is prepared by dissolving LiOH in distilled water, and the active material 110 ground in S42 is mixed and dispersed to prepare a mixed solution 120 as shown. The ground active material 110 is ground to a particle size that is larger than the size of primary particles and has a uniform size. The mixed solution 120 may be kept in a stirred state using a magnetic stirrer 125. When the mixed solution 120 is sprayed into a heating container 140 maintained at 100 to 300° C. through a spray nozzle 130 of spray drying equipment, the active material particles ground down to the level of primary particles by removal of moisture in microdroplets 120' of the mixed solution 120 agglomerate to form secondary particles, namely, re-granulation, and the spray dried active material 120" coated with the lithium precursor on the active material particle surface may be obtained from a collection container 150.

The particle size of the spray dried active material 120" may be adjusted by adjusting the density of the mixed solution 120, the temperature in the heating container 140 and the size of the microdroplets 120'. Accordingly, through the annealing process as described below, the reusable active material obtained according to the present disclosure may have similar particle size distribution to fresh active material. In the specification, volume % of particles having the same particle size with a difference in the range of ±2% is defined as the similar particle size distribution.

Subsequently, annealing is performed on the active material having the lithium precursor added thereto, obtained in the previous step S44 (S50).

In S50, the crystal structure of the active material is recovered through annealing, so the characteristics of the reusable active material are recovered or improved to the level of unused fresh active material.

The transformation structure may be found in the active material surface through the previous steps S30 and S40. For example, NCM-based lithium composite transition metal oxide as the active material may have a spinel structure due to transformation of Ni into rock-salt [$NiCO_3.2Ni(OH)_2$) $H_2O$] by the moisture in S40. When batteries are manufactured in this state, the battery characteristics may degrade such as capacity reduction. The present disclosure recovers the crystal structure through S50. For example, NCM-based lithium composite transition metal oxide as the active material is recovered to a hexagonal structure. Accordingly, it is possible to recover or improve the initial characteristics to the similar level to fresh active material.

The annealing may be performed in air at 400 to 1000° C. The annealing temperature may be 600 to 900° C. The temperature is subject to change within the limited range depending on the type of the lithium precursor. The annealing time may be at least 1 hour. Preferably, the annealing time is about 5 hours. When the annealing time is long, the crystal structure may be sufficiently recovered, but the prolonged annealing does not greatly affect the performance. The annealing time is, for example, about 15 hours or less. The annealing equipment may be similar or identical to that of the thermal treatment step S30.

For example, when $Li_2CO_3$ is used as the lithium precursor, the annealing temperature is preferably 700 to 900° C., and more preferably, 710 to 780° C. It is because the melting point of $Li_2CO_3$ is 723° C. Most preferably, the annealing is performed at 750° C. When LiOH is used as the lithium precursor, the annealing temperature is preferably 400 to 600° C., and more preferably, 450 to 480° C. It is because the melting point of LiOH is 462° C.

Preferably, the annealing temperature is higher than the melting point of the lithium precursor. However, at temperatures higher than 1000° C., the thermal decomposition of the positive electrode active material occurs and degrades the performance of the active material, and accordingly the annealing temperature does not exceed 1000° C.

Through S50, when it melts, the lithium precursor may induce agglomeration of the active material particles, and in this process, re-granulation may be accomplished. The reusable active material may be obtained by S50.

Optionally, S60 may be performed. In S60, surface-coating is performed on the active material annealed in S50.

The surface-coating step may include coating at least one of a metal, an organic metal or a carbon material on the surface by a solid or liquid phase process and thermally treating at 100 to 1200° C. When thermal treatment is performed at higher temperatures than 1200° C., performance degradation may occur due to the thermal decomposition of the positive electrode active material. In the surface-coating, coating on the surface by a solid or liquid phase process may use mixing, milling, spray drying and grinding.

Through the surface-coating, a surface protection layer of different metals is formed. In case that the molar ratio of lithium:other metal in the positive electrode active material is 1:1, when the molar ratio of lithium:other metal in the positive electrode active material reduces to less than 1:1 by the reaction of lithium in the active material with the surface coating material, it fails to exhibit the capacity 100%. Accordingly, excess lithium is added in the previous step S44 to compensate for the lithium loss so that the molar ratio of lithium:other metal in the positive electrode active material is 1:1, as well as to include more lithium at a molar ratio of 0.0001 to 0.1 to other metal in the positive electrode active material. Accordingly, it is possible to form the surface protection layer such that the molar ratio of lithium: other metal in the positive electrode active material is 1:1 in the surface-coating.

In detail, when the active material is coated with metal oxide such as B, W, B-W and thermally treated, a lithium boron oxide layer may be formed on the active material surface, and this serves as the surface protection layer. The lithium additionally included at the molar ratio of 0.0001 to 0.1 in S44 reacts with metal oxide such as B, W, B-W in S60, and the molar ratio of lithium:other metal in the positive electrode active material does not reduce to less than 1:1, so there is no capacity reduction.

The reusable active material obtained by the above-described method may be represented by Formula 1.

$$Li_aNi_xMn_yCo_zM_wO_{2+\delta} \quad \text{[Formula 1]}$$

where M comprises at least one selected from the group consisting of B, W, Al, Ti and Mg, $1<a\leq 1.1$, $0<x<0.95$, $0<y<0.8$, $0<z<1.0$, $0\leq w\leq 0.1$, $-0.02\leq\delta\leq 0.02$, $x+y+z+w=1$.

The reusable active material may have the F content of 100 ppm or less. According to the present disclosure, the active material having the reduced F content may be collected, and when reused as active materials, may provide excellent resistance characteristics and capacity characteristics.

According to the present disclosure, LiF or metal fluoride is removed in the washing step of S40. The particle non-uniformity correction through the lithium precursor addition and particle adjustment is accomplished in the grinding and lithium precursor addition steps (S42, S44). The step of washing using the lithium compound solution which is basic in an aqueous solution and drying is safe and low-priced, and may remove LiF or metal fluoride without losses of other elements and prevent the dissolution of transition metal, and thus compensate for the lithium loss occurring during the process without affecting the structure of the positive electrode. In particular, when the lithium precursor addition step (S44) is performed using spray drying, it is possible to add the lithium precursor by a simple method and it helps to have a similar particle size to fresh active materials. The annealing step is also safe and low-priced and can recover the crystal structure, i.e., improve the crystallinity, thereby enhancing the battery characteristics of the reusable active material.

The reusable active material obtained according to the present disclosure may have similar particle size distribution to fresh active material, which eliminates the need for separate treatment for particle size distribution adjustment. Since carbon produced by carbonization of the binder or the conductive material does not remain on the surface, there is no need for a carbon removal step. Accordingly, the active material obtained through the method of FIG. 2 may be used to manufacture the positive electrode without any treatment.

The reusable active material may be used 100% without composition adjustment or mixed with fresh active material, and may be used to prepare a slurry in combination with a conductive material, a binder and a solvent.

Hereinafter, the experimental example of the present disclosure will be described in detail.

Experimental Example

Evaluation is performed on positive electrode active materials prepared by the following method.

The experiment is performed largely in two categories. The first is an experiment related to grinding of S42, and the second is an experiment for validation of the effect of the method according to the present disclosure on the NCM-based active material.

The following is the experiment of the first category.

The microparticles experiment by the grinding of S42 is performed by ball milling using a mixture of 15 g of positive electrode active material from which the binder and the conductive material are removed through S30 according to the present disclosure with zirconia balls (1 to 5 mm) at a ratio of 1:4. A powder shaker is used as the ball mill, and the ball milling is performed for 1 to 3 hours using the zirconia balls. In addition to the powder shaker, the grinding equipment may include a ball mill, for example, a planetary mill, and a grinder, a 3-roll mill and a jet mill. Some of them may use zirconia balls to form microparticles.

(Sample #1) Sample #1 is fresh positive electrode active material.

(Sample #2) Sample #2 is positive electrode active material from which the binder and the conductive material are removed through S30 according to the present disclosure. Sample #2 is obtained by thermal decomposition of the binder and the conductive material by applying heat to positive electrode scrap at 550° C. for 30 minutes.

(Sample #3) Sample #3 is positive electrode active material obtained by ball-milling sample #2 for 1 hour by the above presented method.

(Sample #4) Sample #4 is positive electrode active material obtained by ball milling sample #2 for 3 hours by the method presented above.

(Sample #5) Sample #5 is obtained by annealing sample #4 at 750° C. for 5 hours with an addition of $Li_2CO_3$ as the lithium precursor. That is, S44 and S50 of the method of the present disclosure are further performed. $Li_2CO_3$ is added in a solid state by a mixing method using a mortar mixer.

Figure 4:
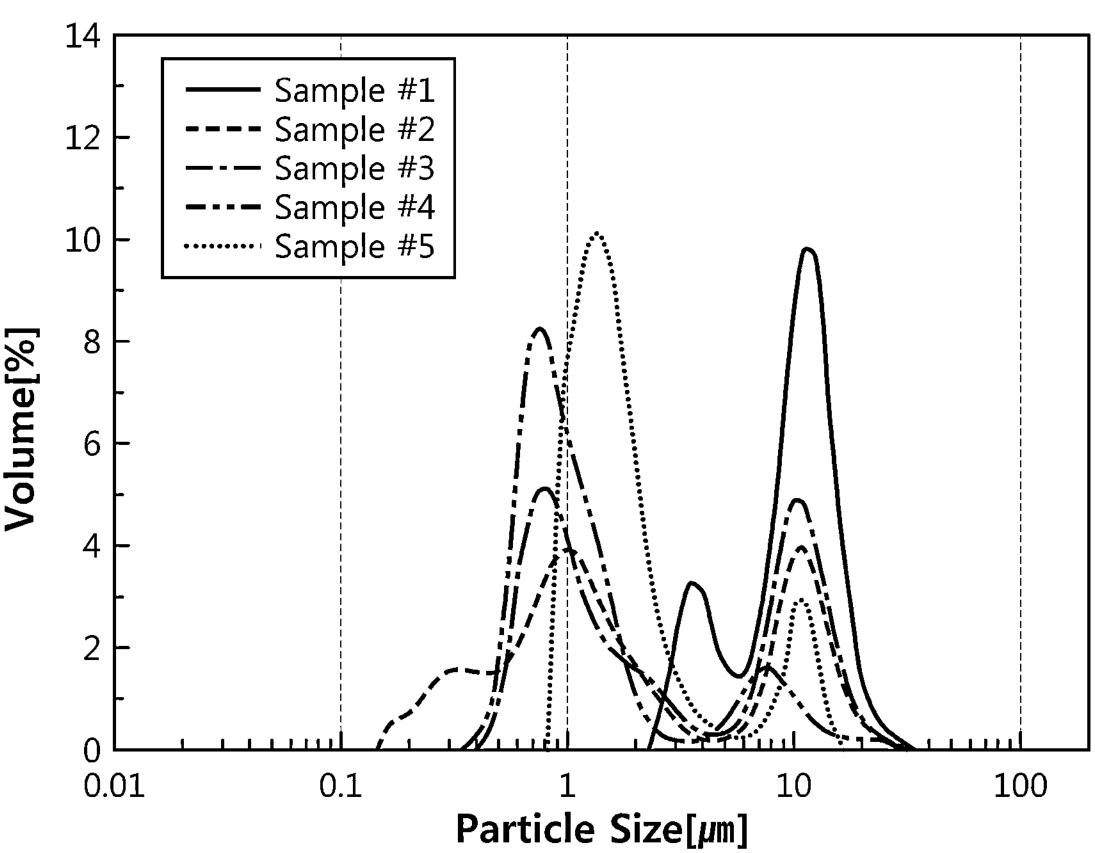
FIG. 4 is a particle size distribution graph of sample active materials.
Figure 5:
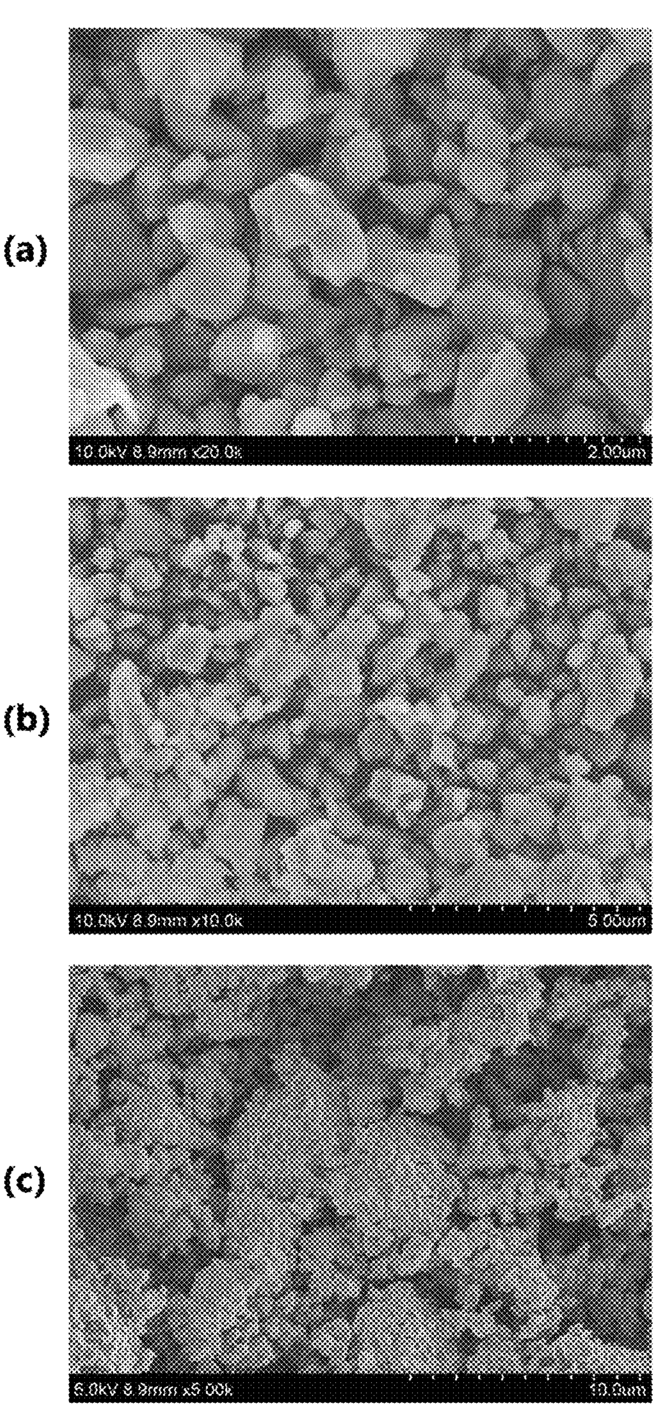
FIGS. 5 and 6 are scanning emission microscope (SEM) images of sample active materials.
Figure 6:
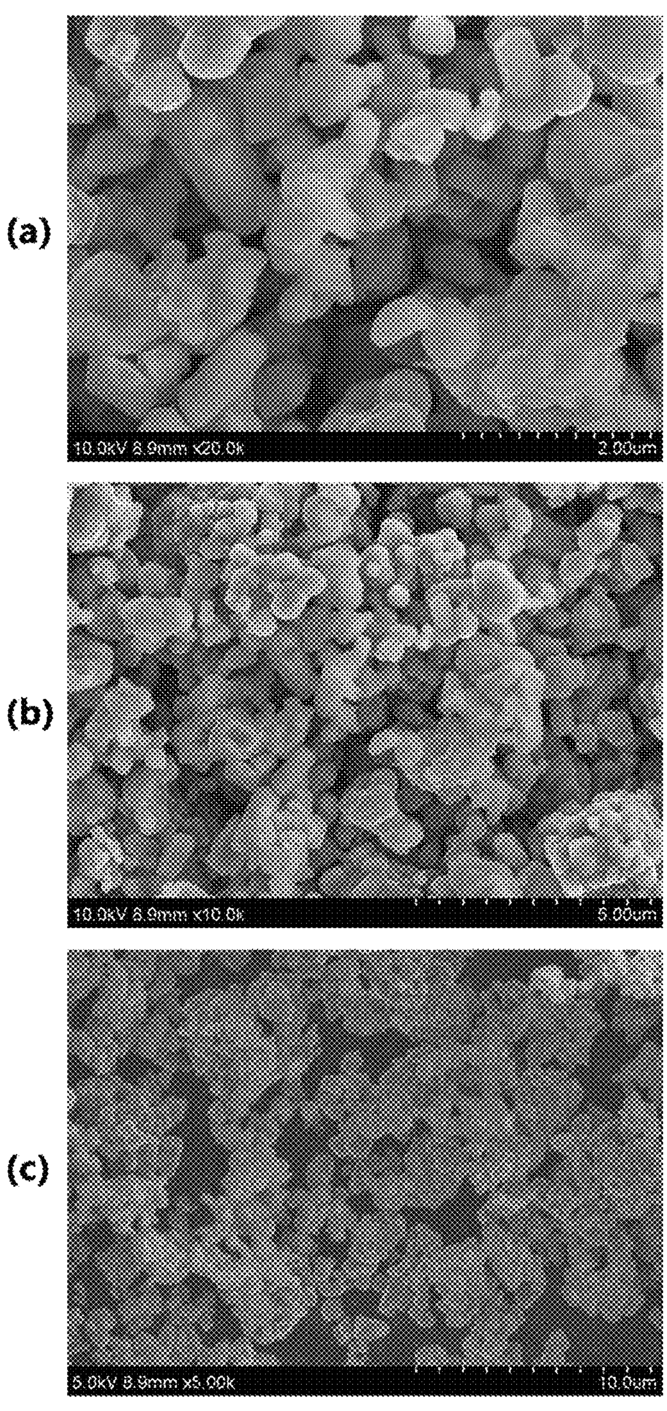

FIG. 4 is a particle size distribution graph of the sample active materials. FIGS. 5 and 6 are scanning emission microscope (SEM) images of the sample active materials. The SEM images are captured using SEM equipment commonly used in the lab. For example, imaging may be performed using HITACHI s-4200. However, there is no difference depending on the measuring device or method.

First, referring to FIG. 4, in the case of sample #2, it is found that the active material of sample #1 is broken down into particles of sub-micron size (less than 1 micrometer) by the forces applied in the electrode process. In the case of sample #3 obtained by ball milling fine particles, smaller particles in the fine particles tend to agglomerate to form microparticles and larger particles tend to become smaller through the ball milling process. Additionally, in the case of sample #4 having a longer milling time than sample #3, the result shows that the distribution of fine particles reduces and the distribution of macroparticles also reduces. That is, it can be seen that as the milling time increases, macroparticles reduce and become microparticles, and fine particles tend to become microparticles.

It is determined that the grinding condition of sample #4 of 3-hour ball milling is the most suitable for breaking down the active material into microparticles through grinding. FIG. 5 presents SEM images of sample #4 at various magnifications and microparticles in sub-micron size may be observed.

Referring back to FIG. 4, in the case of sample #5 obtained by annealing sample #4 with an addition of $Li_2CO_3$, since the melting point of $Li_2CO_3$ is 723° C. and annealing is performed at 750° C., when it melts, $Li_2CO_3$ further induces particle agglomeration, and as a result, sub-micron sized particles form microparticles at 1 to 2 micrometer level. Additionally, macroparticles also agglomerate with microparticles or fine particles, resulting in a slight increase of particle size. FIG. 6 presents SEM images of sample #5 at various magnifications, and when compared with FIG. 5, there is a slight increase in particle size.

In FIG. 4, sample #5 shows the opposite particle size distribution to sample #1. In this experiment, the particle size distribution such as shown in sample #5 is obtained by adding the lithium precursor in a solid state, and when other granulation equipment such as liquid phase spray drying or a powder shaker is used to add the lithium precursor, re-granulation of microparticles may be accomplished according to the size and the similar particle size distribution to sample #1 may be obtained. When the lithium precursor is mixed in a granulated powder form or dissolved in a solvent and mixed with the ground active material, re-granulation may be accomplished. For example, in the case of spray drying, the particle size may be variously adjusted by changing the conditions after dissolving the lithium compound in the solvent (the aqueous solution or organic solvent) and mixing with the positive electrode active material.

That is, this experiment verifies that it is possible to adjust the particle size distribution according to how microparticles are made, and in particular, when the grinding step is included as proposed, it is possible to reduce fine particles generated by the forces applied to the electrode.

The next is the experiment of the second category. The electrochemical performance is evaluated using each of the positive electrode active materials prepared by the method of examples and comparative examples as described below.

Example 1

Reusable active material is collected by the active material reuse method of the present disclosure as described above. Positive electrode scrap discarded after punching the positive electrode plate having NCM-based lithium composite transition metal oxide as the active material is prepared and the thermal treatment of S30 is performed at 550° C. for 30 minutes. The washing of S40 is performed for 10 minutes using LiOH.

S42 is performed by performing ball-milling for 3 hours such as described in sample #4 of the previous category experiment. S44 is performed by adding $Li_2CO_3$ using a mortar mixer such as described in sample #5 of the previous category experiment. Additionally, in S44, the lithium precursor ($Li_2CO_3$) is fed in an amount for adding more lithium at the molar ratio of 0.09 during the process based on the molar ratio (Inductively Coupled Plasma (ICP) analysis) of lithium and other metal in the raw active material, and annealing is performed at 750° C. for 15 hours according to S50. Theoretically, in the case of fresh active material, the molar ratio of lithium:other metal is 1:1, but since an average error of ICP equipment for measuring the molar ratio is ±0.05, and preferably about ±0.02, the molar ratio of lithium:other metal in the raw active material may be 1±0.05:1 through ICP measurement. In this experiment, the lithium precursor is added based on the analysis ratio through ICP analysis.

Example 2

In addition to example 1, the active material surface protection layer recovery process of S60 is performed.

Comparative Example 1

Fresh NCM-based lithium composite transition metal oxide, not reusable active material, is used.

Comparative Example 2

Only thermal treatment of S30 in the active material reuse method of the present disclosure as described above is performed to remove the binder and the conductive material and separate the Al current collector, and NCM-based lithium composite transition metal oxide active material is collected. S30 is performed in the same condition as example 1. The steps subsequent to S40 in the active material reuse method of the present disclosure are not performed.

Comparative Example 3

Further to comparative example 2, active material is collected by performing the surface modification of S40 of the active material reuse method of the present disclosure, but the steps subsequent to S42 in the active material reuse method of the present disclosure are not performed. S40 is performed in the same condition as example 1.

Comparative Example 4

Further to comparative example 2, NCM-based lithium composite transition metal oxide active material is collected by performing the crystal structure recovery of S50 of the above-described active material reuse method of the present disclosure without the surface modification of S40 and S42 and S44. It should be noted that annealing for crystal structure recovery is performed without lithium precursor addition.

Comparative Example 5

S30, S40 and S50 of the active material reuse method are performed in the same way as example 1. It should be noted that annealing for crystal structure recovery is performed without lithium precursor addition.

ICP analysis is performed on the positive electrode active material collected or prepared in each of the examples and comparative examples to analyze an amount of remaining LiF, a ratio of lithium and other metal in the active material, and an amount of a specific element such as B or W.

Additionally, the electrochemical performance is evaluated using cells (Coin Half Cell, CHC) manufactured by metering 96.25 wt % of the positive electrode active material collected or prepared in each of the examples and comparative examples, 1.5 wt % of carbon black as the conductive material and 2.25 wt % of PVdF as the binder, mixing with NMP to prepare a slurry and manufacturing the positive electrode.

To determine an amount of LiF remaining in the active material collected in comparative examples 2 and 3, F detection and analysis is performed by ICP. The result is shown in the following Table 1.

TABLE 1

| | Comparative example 2 | Comparative example 3 |
|---|---|---|
| F content (mg/kg) | 1450 | ND |

ND indicates 30 ppm or less as measured. Referring to Table 1, a significant reduction in the F content in the collected positive electrode active material is found in comparative example 3 compared to comparative example 2. That is, it can be seen that LiF is completely dissolved in the lithium compound solution by washing, and thus removed so completely that it cannot be detected by ICP. Accordingly, it can be seen that LiF removal is performed remarkably well by S40.

To detect any change of lithium in the positive electrode active material during S30 and S40 of the present disclosure, a ratio of lithium/other metal in the active material is analyzed by ICP. The result is shown in the following Table 2.

TABLE 2

| | Comparative example 1 | Comparative example 2 | Comparative example 3 |
|---|---|---|---|
| Ratio of lithium and other metal in active material | 0.99 | 0.95 | 0.91 |

Referring to Table 2, it can be seen that comparative example 2 has a reduction in the ratio of lithium/other metal by approximately 0.2 to 0.5 through thermal treatment of S30 compared to comparative example 1, and comparative example 3 has a reduction in the ratio of lithium/other metal by approximately 0.2 to 0.5 through washing and drying of S40 compared to comparative example 2. It seems that NCM-based lithium composite transition metal oxide has a large reduction in the ratio of lithium to other metal due to the relatively large specific surface area of particles and transformation to the spinel structure. Accordingly, it can be seen that it is necessary to compensate for the deficient lithium. Table 2 shows the values measured by ICP analysis, and ICP analysis has an error value of about ±0.02 as mentioned above. Accordingly, in comparative example 1 of fresh active material, the ratio of lithium and other metal may be smaller than 1. Accordingly, an amount of lithium precursor added to compensate for lithium loss is a reduced amount of lithium based on the ratio (the molar ratio analyzed by ICP) of lithium and other metal in the raw active material (i.e., fresh active material) used in the active material layer.

Figure 7:
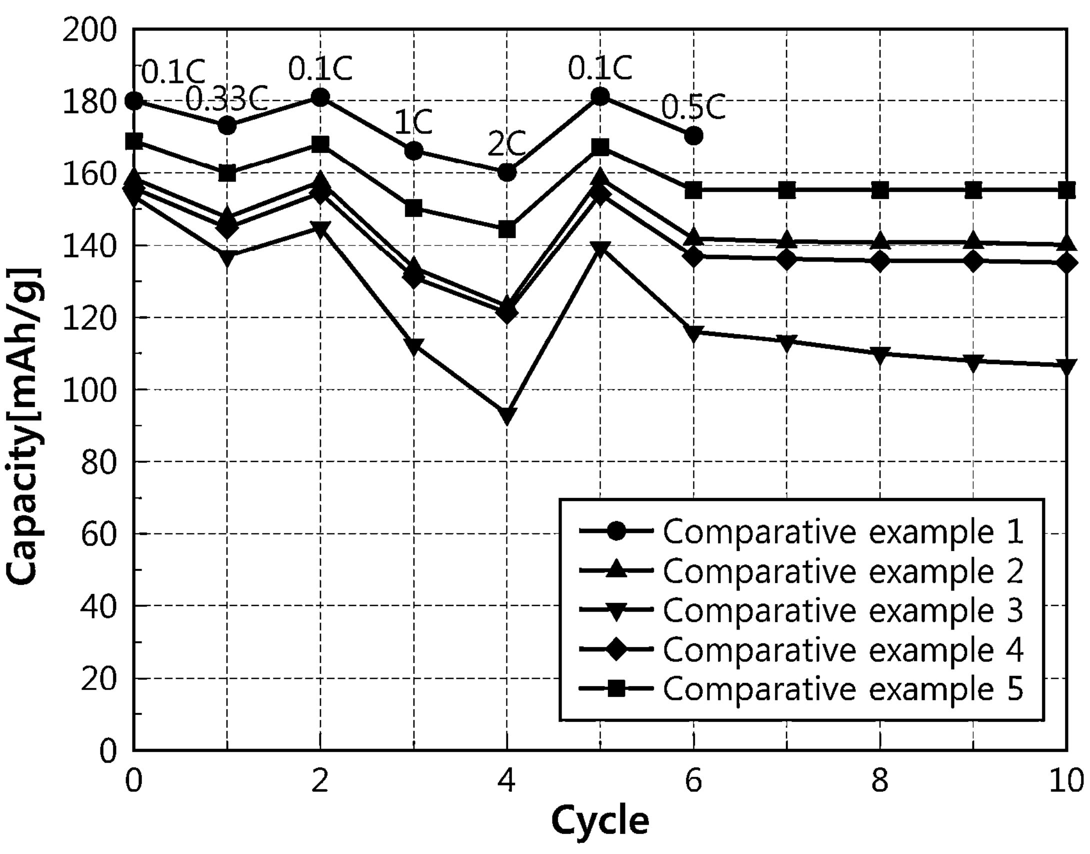
FIGS. 7 and 8 show the results of cell evaluation using active materials of example and comparative examples.
Figure 8:
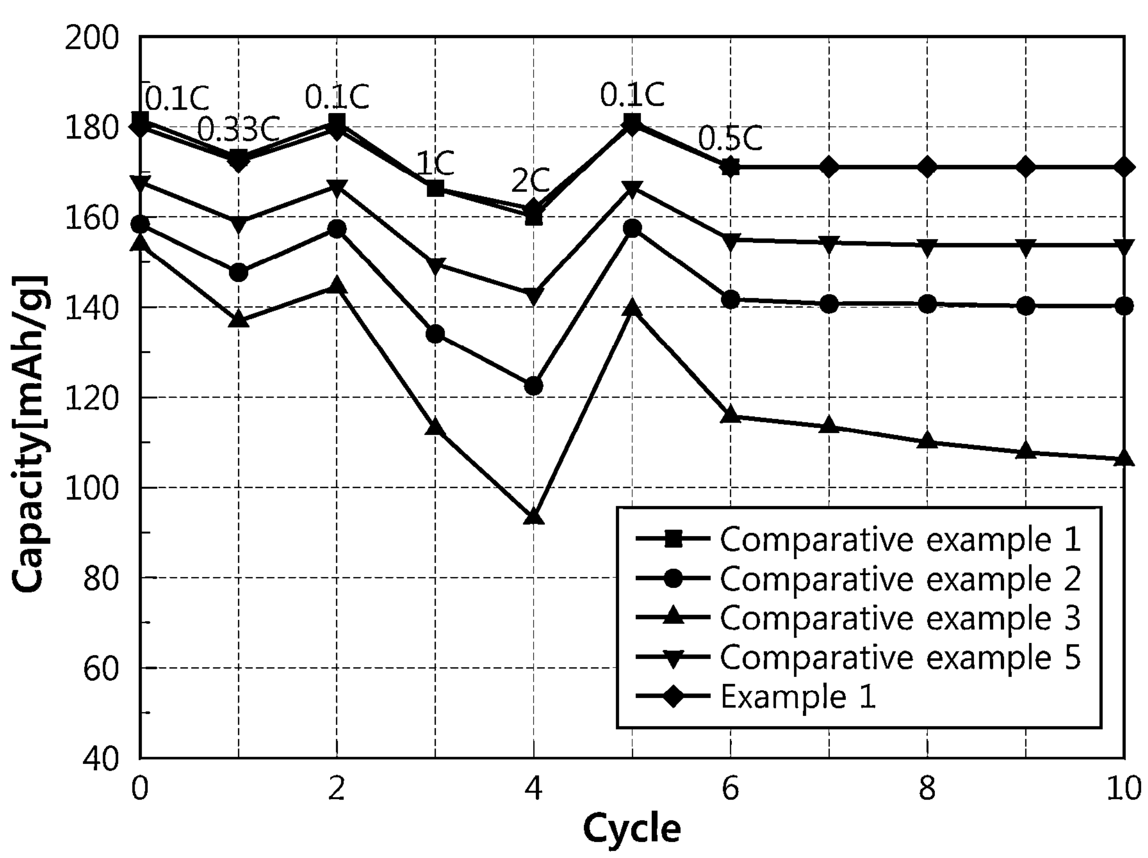

FIGS. 7 and 8 show the results of cell evaluation using the active materials of example and comparative examples. At different currents, the rate performance is evaluated by evaluating the capacity as a function of cycle number. The equipment used for evaluation is a charge/discharge tester commonly used in the lab. There is no difference depending on the measuring device or method. In the graphs of FIGS. 7 and 8, the horizontal axis indicates the cycle number and the vertical axis indicates capacity.

Voltage is 3 to 4.3V, and initial formation charge/discharge is performed at 0.1 C/0.1 C. The electrolyte solution for the cell is a carbonate based electrolyte solution and includes Ethylene carbonate (EC):Ethyl methyl carbonate (EMC)=3:7 with an addition of additives.

First, referring to FIG. 7, in the case of comparative example 2 before surface modification and comparative example 3 after surface modification following primary thermal treatment (550° C./30 min) for desorption, comparative example 3 having undergone surface modification shows a rapid reduction in electrode capacity. This is because Ni in NCM-based lithium composite transition metal oxide transforms into rock-salt by moisture as mentioned above, resulting in capacity reduction.

However, when annealing (750° C./15 hr) is performed without surface modification, this corresponds to comparative example 4, and when compared with comparative example 2, there is little capacity improvement effect. This is due to LiF remaining on the active material surface when surface modification is not performed. As shown above in Table 1, LiF is removed at a satisfactory level by washing.

When surface modification and annealing are performed after primary thermal treatment, the capacity increases as shown in comparative example 5. The reason is that although the capacity reduces after surface modification as shown in comparative example 3, Ni rock-salt is reduced through annealing after removal of LiF by surface modification and its structure is recovered to a hexagonal shape.

Subsequently, referring to FIG. 8, it is found that example 1 has the improved capacity, compared to comparative example 5. Compared to comparative example 5, example 1 involves grinding for adjusting the particle size distribution and lithium precursor addition. It can be seen that the capacity is improved by compensating for lithium lost in the previous steps by the addition of the lithium precursor. The lithium loss through thermal treatment and washing is described with reference to Table 4.

The lithium compound is added at a ratio of lithium loss to the existing lithium content in the positive electrode active material based on the results of ICP analysis (Table 2), and as a result, the addition at the molar ratio of 0.09 to 0.1 shows the capacity improvement effect at the equivalent level to comparative example 1 as can be seen from the additional experiment.

According to the present disclosure, it is possible to collect the active material from the positive electrode scrap at the directly usable level. It is safe since toxic and explosive solvents such as NMP, DMC, acetone and methanol are not used, and since simple and safe processes such as thermal treatment, washing and drying, and annealing are used, it is suitable for mass production.

Figure 9:
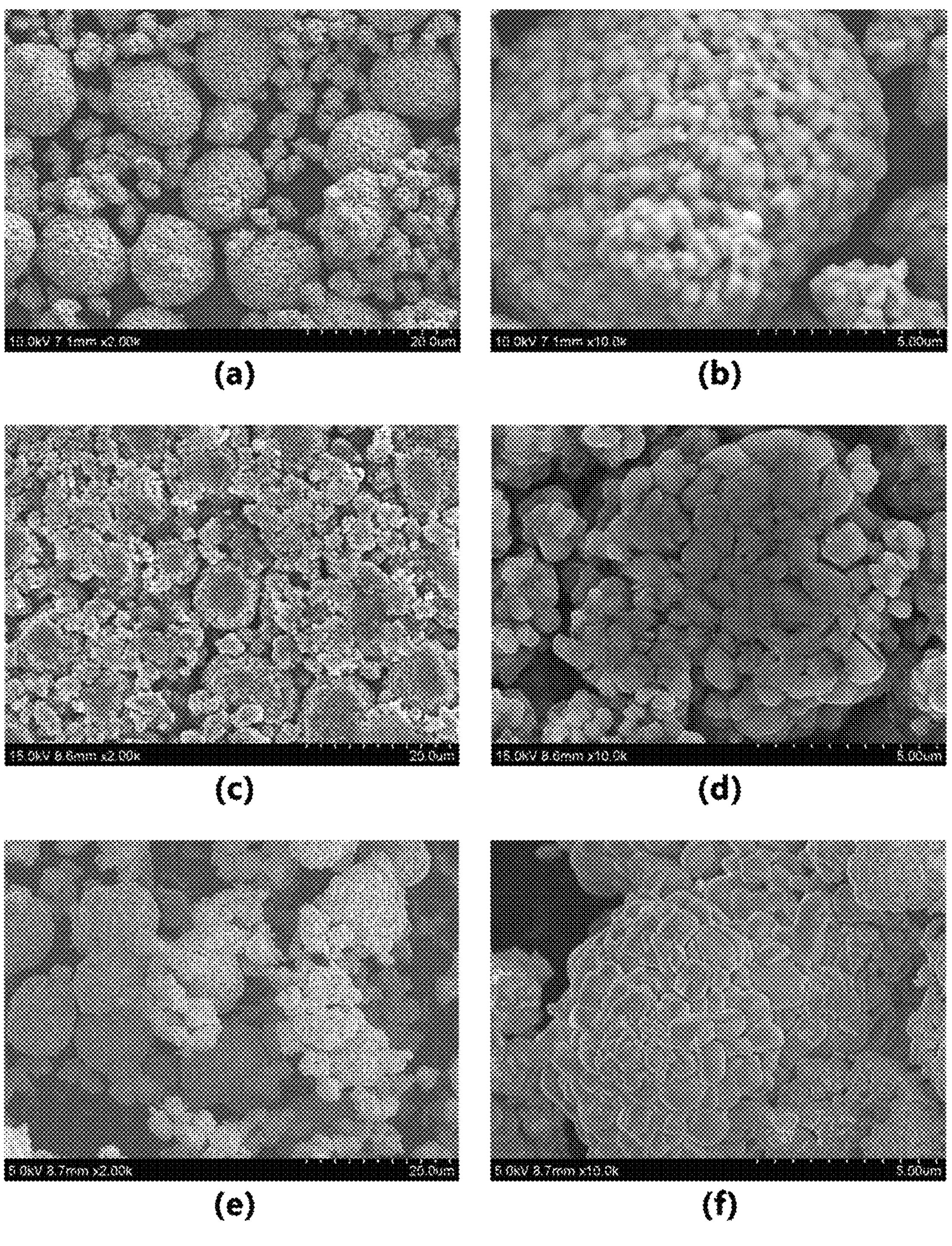
FIGS. 9 and 10 are SEM images of active materials of example and comparative examples.
Figure 10:
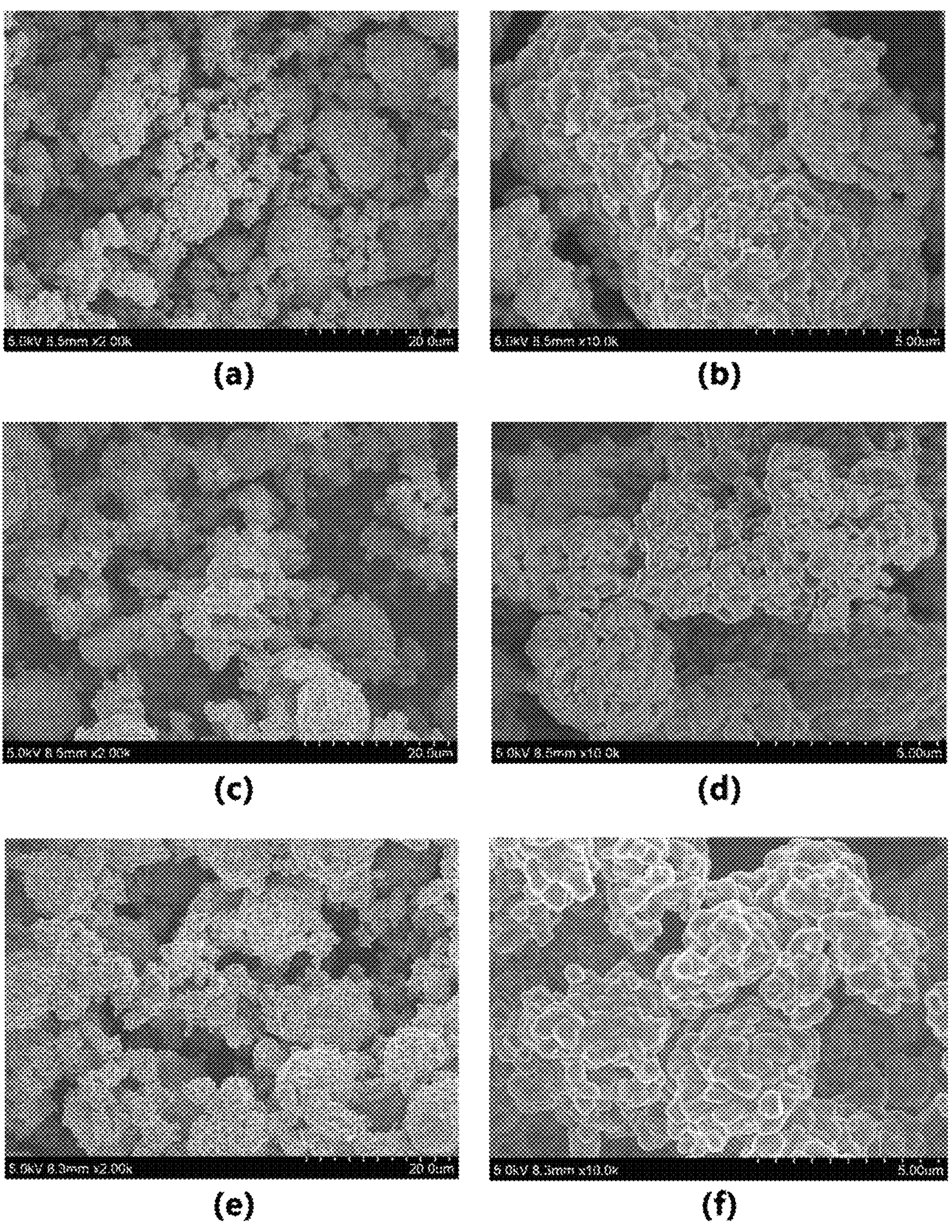

FIGS. 9 and 10 are SEM images of the active materials of example and comparative examples.

(a) of FIG. 9 is a SEM image of the fresh active material of comparative example 1, and (b) is an enlarged image of (a). (c) shows the surface of positive electrode scrap from fresh active material, and (d) is an enlarged image of (c). The fresh active material has no particle cracking or chipping, but positive electrode scrap from the electrode shows pressed and cracked or chipped particles on the surface by the roll pressing process.

(e) of FIG. 9 is a SEM image of comparative example 2, and (f) is an enlarged image of (e). Referring to (e) and (f), the binder or the conductive material is not observed in the collected active material. That is, it can be seen that the binder or the conductive material is removed during high temperature thermal treatment. Accordingly, it can be seen that the active material is separated from the current collector and the binder or the conductive material is seldom left on the active material surface by thermal treatment in air.

(a) of FIG. 10 is a SEM image of comparative example 3, and (b) is an enlarged image of (a). When comparing (c) and (d) of FIG. 9 showing positive electrode scrap, it can be seen that particles are dispersed through the process.

(c) of FIG. 10 is a SEM image of comparative example 5, and (d) is an enlarged image of (c). (e) is a SEM image of example 1 and (f) is an enlarged image of (e). It can be seen that the particles dispersed in the previous step form agglomerates through annealing. Additionally, when comparing (f) of FIG. 10 with (a) of FIG. 9, it can be seen that the reusable active material of example 1 shows the same shape as fresh active material.

Figure 11:
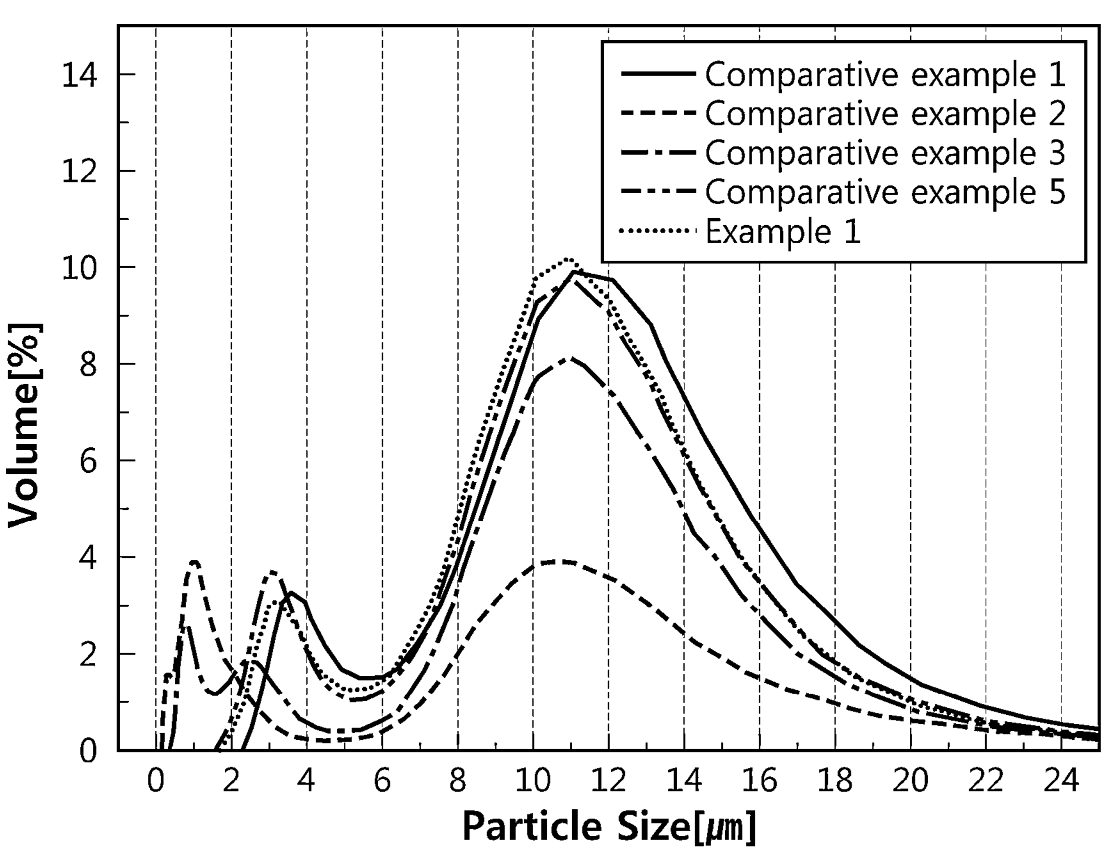
FIG. 11 is a particle size distribution graph of active materials of example and comparative examples.

FIG. 11 is a particle size distribution graph of the active materials of example and comparative examples. The particle size distribution may be obtained using a particle size analyzer commonly used in the lab. For example, measurements may be performed using Horiba LA 950V2 particle size analyzer. However, there is no difference depending on the measuring device or method. In FIG. 11, the horizontal axis is particle size (um) and the vertical axis is volume %.

The particle size distribution graph results of FIG. 11 are consistent with the SEM results of FIGS. 9 and 10. Since the NCM-based active material suffers severe particle cracking or chipping by the roll pressing in the electrode formation, a large amount of small particles is observed in the particle size distribution of comparative example 2 after primary thermal treatment, and comparative example 3 after surface modification shows a higher distribution of small particles. However, when annealing is performed, particle agglomeration increases as shown in the previous SEM results, so comparative example 5 or example 1 has similar particle size distribution to comparative example 1 of fresh active material. In particular, since example 1 involves grinding to a particle size that is larger than the size of the primary particles, the particle size distribution of example 1 is more similar to that of comparative example 1. Volume % of particles having the same particle size with a difference in the range of ±2% is defined as the similar particle size distribution. According to the present disclosure, the particle size distribution of the reusable active material is not different from that of fresh active material and the initial characteristics are almost maintained, and it is expected that the characteristics of batteries including the reusable active materials will be on a similar level to the characteristics of batteries using fresh active materials.

An amount of a specific element is analyzed by performing ICP analysis on the positive electrode active material collected or prepared in each of the example and comparative examples. The result is shown in the following Table 3.

TABLE 3

| | B content (mg/kg) | W content (mg/kg) |
|---|---|---|
| Comparative example 1 | 500 | 3100 |
| Comparative example 2 | 200 | 2700 |
| Comparative example 3 | ND | 200 |
| Comparative example 5 | ND | 200 |
| Example 1 | ND | 200 |

The fresh active material used in this experiment further includes B and W as seen in comparative example 1. In the case of comparative example 2, it can be seen that the B and W content reduces through thermal treatment, and the remaining results reveal that B is almost completely removed in the subsequent processes. In the case of W, it can be seen that a large amount is removed in the surface modification process through washing as in comparative example 3.

Accordingly, a specific element may be lost during the process according to the type of the active material initially used, and in particular, may be completely removed or remain in a small amount in the surface modification process through washing, and in some instances, the characteristics may not be completely recovered by performing the active material reuse method until annealing as in example 1. In such a case, it is desirable to perform an additional surface-coating step as proposed. In this experimental example, the surface-coating step includes coating with B and W. The surface-coating may serve as the surface protection layer of the positive electrode active material. The surface-coating may be a process of compensating for a deficient specific element, and at the same time, recovering the surface protection layer in the fresh active material. In the case of the fresh active material used in this experiment, the surface protection layer includes B-W, and lithium loss during the process is interpreted as a ratio of (lithium in the active material itself+lithium for forming the surface protection layer):other metal, not a 1:1 ratio of lithium in the active material itself and other metal. Accordingly, in the above experiment, the molar ratio of 0.09 of the lost lithium in comparative example 3 may be interpreted as the sum of lithium in the positive electrode active material and lithium for forming the surface protection layer, and in the embodiments, the lithium precursor is added in an amount for replenishing lithium.

The surface-coating step goes through a thermal treatment process after solid or liquid phase reaction.

When the reusable active material is represented by the following Formula 1, $$Li_aNi_xMn_yCo_zM_wO_{2+\delta} \quad \text{[Formula 1]}$$

where M comprises at least one selected from the group consisting of B, W, Al, Ti and Mg, $1<a\leq1.1$, $0<x<0.95$, $0<y<0.8$, $0<z<1.0$, $0\leq w\leq0.1$, $-0.02\leq\delta\leq0.02$, $x+y+z+w=1$, it is thought that M in Formula 1 is replenished through surface-coating.

When the surface coating layer includes B, B-W, B-Ti, B-W-Ti, the surface-coating thermal treatment may be performed at temperatures of 200 to 500° C., and coating may be performed using other metal materials, carbon materials and organic metal materials at temperatures between 100 and 1200° C.

According to the present disclosure, it is possible to reuse positive electrode scrap using a simple, eco-friendly and economical method, and a lithium secondary battery manufactured reusing the prepared NCM-based lithium composite transition metal oxide positive electrode active material does not have a problem with the battery performance.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A method for recycling a positive electrode active material, comprising:

(a) thermally treating a positive electrode scrap comprising an active material layer on a current collector in air for thermal decomposition of a binder and a conductive material in the active material layer, to separate the current collector from the active material layer, and collecting an active material in the active material layer;

(b-1) washing the active material collected from the step (a) with a lithium compound solution which is basic in an aqueous solution, and drying;

(b-2) grinding the active material dried from the step (b-1);

(b-3) adding a lithium precursor to the active material ground from the step (b-2);

(c) annealing the active material having the lithium precursor added thereto, to obtain a reusable recycled active material; and (d) surface-coating the active material annealed from the step (c), wherein the active material layer comprises a lithium composite transition metal oxide comprising secondary particles formed by agglomeration of primary particles having a predetermined size, and the grinding step (b-2) comprises reducing the size of the active material dried from the step (b-1) to a particle size that is smaller than the predetermined size and larger than the size of the primary particles, and wherein the step (b-3) comprises mixing the active material ground from the step (b-2) with a lithium precursor solution and spray drying to obtain the active material with an adjusted particle size.

2. The method according to claim 1, wherein the lithium composite transition metal oxide comprises nickel, cobalt and manganese.

3. The method according to claim 1, wherein the thermal treatment in the step (a) is performed at 300 to 650° C.

4. The method according to claim 1, wherein the lithium compound solution contains a lithium compound in an amount of more than 0% and 15% or less, and the washing is performed for up to 1 hour.

5. The method according to claim 1, wherein the washing in the step (b-1) is performed by stirring the active material collected from the step (a) at the same time with immersing in the lithium compound solution.

6. The method according to claim 1, wherein the grinding step (b-2) is performed using a ball mill, a planetary mill, a grinder, a 3-roll mill or a jet mill.

7. The method according to claim 1, wherein the lithium precursor is one or more selected from the group consisting of LiOH, $Li_2CO_3$, $LiNO_3$ and $Li_2O$.

8. The method according to claim 1, wherein the lithium precursor is added in an amount for adding lithium at a ratio of lost lithium to a ratio between lithium and other metal in a raw active material used in the active material layer.

9. The method according to claim 1, wherein the lithium precursor is included in the lithium precursor solution in an amount corresponding to an amount of lithium at a molar ratio of 0.001 to 0.4 relative to an amount of lithium in the active material layer.

10. The method according to claim 9, wherein an additional lithium precursor is further included in the lithium precursor solution in an amount corresponding to an amount of lithium at a molar ratio of 0.0001 to 0.1 relative to an amount of lithium in the active material layer.

11. The method according to claim 1, wherein the annealing is performed in air at 400 to 1000° C.

12. The method according to claim 1, wherein a temperature of the annealing step exceeds a melting point of the lithium precursor.

13. The method according to claim 1, wherein the active material in the active material layer is collected in a form of powder, and carbon produced by carbonization of the binder or the conductive material does not remain on a surface of the powder.

14. The method according to claim 1, wherein the surface-coating step (d) includes coating at least one of a metal, an organic metal or a carbon material on a surface of the active material annealed from the step (c) by a solid or liquid phase process, and thermally treating at 100 to 1200° C.

15. The method according to claim 1, wherein the reusable recycled active material is represented by the following Formula 1:

$$Li_aNi_xMn_yCO_zM_wO_{2+\delta} \quad \text{[Formula 1]}$$

where M comprises at least one selected from the group consisting of B, W, Al, Ti and Mg, $1<a\leq1.1$, $0<x<0.95$, $0<y<0.8$, $0<z<1.0$, $0\leq w\leq0.1$, $-0.02\leq\delta\leq0.02$, $x+y+z+w=1$.

16. The method according to claim 1, wherein the reusable recycled active material has a fluorine (F) content of 100 ppm or less.

* * * * *